UNITED STATES PATENT OFFICE.

CARL SCHROETER, OF CHICAGO, ILLINOIS, ASSIGNOR, BY DIRECT AND MESNE ASSIGNMENTS, TO WILLIAM G. KING, OF SAME PLACE.

FIREPROOFING COMPOUND AND METHOD OF MAKING SAME.

SPECIFICATION forming part of Letters Patent No. 641,801, dated January 23, 1900.

Application filed February 20, 1899. Serial No. 706,113. (No specimens.)

*To all whom it may concern:*

Be it known that I, CARL SCHROETER, of Chicago, in the county of Cook and State of Illinois, have invented certain new and useful Improvements in Fireproofing, of which the following is a specification.

This invention relates to fireproofing, and has for its object to provide means whereby textiles and other fabrics, wood, and compounds of various kinds may be conveniently rendered fireproof or non-inflammable, the composition being of such a nature that the fireproofing qualities of the article or articles treated will not be affected by exposure to water or moisture.

The essential elements of my improved fireproofing are borax, $Na_2B_4O_7$, $10H_2O$ or $Na_2O$, $2B_2O_3$, $10H_2O$, sulphate of magnesia, ($MgO\ SO_3+7HO$,) gypsum, ($CaO\ SO_3+H_2O$,) and ammonium chloride, ($NH_4Cl$.)

So far as my improved process hereinafter described and claimed is concerned, both the gypsum and ammonium chloride may be dispensed with, although the compound, which I claim as new, comprises as essential elements the ingredients just specified.

The proportions which I prefer to employ are about three and one-half parts, by weight, of borax and two and one-half parts, by weight, of sulphate of magnesia; but these proportions may be modified, and I do not wish to be understood as limiting myself strictly thereto.

In carrying out my invention I may employ different methods of applying the ingredients to the article to be protected. For instance, in the case of fabrics, such as curtains or the like, the ingredients may be placed in water or liquid starch and the mixture heated to a boiling-point, the articles to be fireproofed being boiled in this mixture. In such a case I have found that nine per cent., by weight, of the above-described mixture gives very effective results. After the fabric has been dried by ironing or otherwise it will be found to be effectively fireproof. In some cases, however, it is not advisable to apply the ingredients simultaneously, for the reason that after having been combined they form in a comparatively short time an insoluble compound. This is due to the fact that the borax combines with the sulphate of magnesia, and thereby produces an insoluble borate of magnesia. A soluble sulphate of soda also appears as a product of this combination. Owing to the production of this insoluble compound it is impracticable to bring the two essential elements of the composition together before applying them where the application will require any great length of time. Therefore for fireproofing wood or other heavy rigid porous substances, in order to facilitate the penetration of the composition into the same to the greatest possible extent, I prefer to apply first one of the essential elements and then the other, using a solution of each one separately. The wood or other substance may be boiled in a closed vessel first with one solution and then with the other, or the solutions may be successively introduced into the pores by pressure in any well-known manner. The two elements thus introduced form a borate of magnesia which is insoluble and which impregnates the pores or fibers of the material and renders the same fireproof, while at the same time the fireproof qualities are not affected by the action of moisture.

Instead of employing sulphate of magnesia other similar sulphates may be substituted therefor without departing from the principle of my invention.

I claim—

1. The hereinbefore-described compound for fireproofing, comprising borax, sulphate of magnesia, gypsum and ammonium chloride, substantially as described.

2. The hereinbefore-described method of fireproofing, which consists in forming separate solutions of borax and sulphate of magnesia and successively applying said solutions to the article or substance to be treated, whereby said article or substance is impregnated with an insoluble borate of magnesia, substantially as described.

CARL SCHROETER.

Witnesses:
  FREDERICK C. GOODWIN,
  IRVINE MILLER.